United States Patent [19]
Okabe et al.

[11] Patent Number: 5,759,392
[45] Date of Patent: Jun. 2, 1998

[54] FUEL FILTER AND FIXING APPARATUS THEREOF

[75] Inventors: Kenji Okabe, Kariya; Yoshihiko Ooya, Takahama; Noriya Matsumoto, Okazaki; Kouji Izutani, Nagoya, all of Japan

[73] Assignee: Nippondenso Co., Ltd., Japan

[21] Appl. No.: 631,700

[22] Filed: Apr. 9, 1996

Related U.S. Application Data

[62] Division of Ser. No. 326,251, Oct. 20, 1994, Pat. No. 5,525,219.

[30] Foreign Application Priority Data

Oct. 21, 1993 [JP] Japan ................................. 5-263686

[51] Int. Cl.$^6$ ............................ B01D 35/30; B01D 27/08
[52] U.S. Cl. ...................... 210/232; 210/249; 248/74.2; 248/74.3; 248/315; 264/248; 264/249; 264/DIG. 48
[58] Field of Search ............................ 210/249, 232; 248/315, 74.2, 74.3; 264/248, 249, DIG. 48

[56] References Cited

U.S. PATENT DOCUMENTS

| | | |
|---|---|---|
| 1,718,390 | 6/1929 | Sweetland . |
| 2,238,003 | 8/1941 | Wilkinson . |
| 2,244,574 | 6/1941 | Rogers . |
| 2,249,071 | 7/1941 | White . |
| 2,277,737 | 3/1942 | Wilkinson . |
| 2,277,738 | 3/1942 | Wilkinson . |
| 2,354,238 | 7/1944 | Wilkinson . |
| 2,511,800 | 6/1950 | Wilkinson . |
| 2,576,144 | 11/1951 | Rood . |
| 2,587,903 | 3/1952 | Rood . |
| 2,589,920 | 3/1952 | Beckett . |
| 2,621,796 | 12/1952 | Wilkinson . |
| 2,647,633 | 8/1953 | Greene . |
| 2,679,913 | 6/1954 | Scott . |
| 3,189,672 | 6/1965 | Lyman . |
| 3,289,986 | 12/1966 | Martin . |
| 3,298,648 | 1/1967 | Sepanski . |
| 3,470,604 | 10/1969 | Zenick . |
| 4,126,557 | 11/1978 | Hodgkins . |
| 4,667,920 | 5/1987 | Kleineberg et al. . |
| 4,780,529 | 10/1988 | Buttry . |
| 4,861,474 | 8/1989 | Kroha . |
| 4,933,079 | 6/1990 | Kroha . |
| 4,956,081 | 9/1990 | Hodgkins et al. . |
| 5,039,406 | 8/1991 | Whittington . |
| 5,084,172 | 1/1992 | Yee . |
| 5,121,894 | 6/1992 | Twork . |
| 5,194,717 | 3/1993 | Cowen et al. . |
| 5,211,547 | 5/1993 | Gaston et al. . |
| 5,213,682 | 5/1993 | Richardson . |
| 5,304,300 | 4/1994 | Parsons . |
| 5,382,355 | 1/1995 | Arlozynski . |
| 5,525,219 | 6/1996 | Okabe . |

FOREIGN PATENT DOCUMENTS

| | | |
|---|---|---|
| 599198 | 1/1926 | France . |
| 2-139358 | 11/1990 | Japan . |
| 93/15820 | 8/1993 | WIPO . |

OTHER PUBLICATIONS

Patent Abstracts of Japan, vol. 16 No. 370 (M-1292) Aug. 1992 re JP-A 04 118326.

*Primary Examiner*—Thomas M. Lithgow
*Attorney, Agent, or Firm*—Cushman Darby & Cushman Intellectual Property Group of Pillsbury Madison & Sutro, LLP

[57] ABSTRACT

The fixing apparatus for fixing a fuel filter in the present invention comprises a ring portion for fixing fuel filter body securely by utilizing contraction force of resin. The fixing apparatus is made of resin softened by heat. The resin fixing apparatus has ring portion for accommodating and fixing a fuel filter. The inside shape of the ring portion is formed similar and somewhat smaller than the outer cylindrical shape of the fuel filter body. When the ring portion is heated and the resin and resin become flexible, the fuel filter is allowed to be press fitted into the ring portion.

18 Claims, 6 Drawing Sheets

II − II

FUEL FILTER AND FIXING APPARATUS THEREOF

CROSS REFERENCE TO RELATED APPLICATIONS

This is a division of application Ser. No. 08/326,251, filed Oct. 20, 1994 (now U.S. Pat. No. 5,525,219).

This application claims priority from Japanese application No. 5-263686 filed on Oct. 21, 1993, the contents of which are incorporated hereinto by reference.

BACKGROUND OF THE INVENTION

1. Field of the Invention

The present invention relates to a fuel filter and fixing apparatus for fixing the fuel filter to an automotive body.

2. Description of Related Art

An fuel injection apparatus used generally for automobiles is shown in FIG. 1. Fuel in fuel tank 90 is pumped by electrically powered fuel pump 80 and is supplied to an engine (not shown) through fuel passage 50 in which fuel filter 100 is installed. Fuel adjusted to a predetermined pressure value by pressure regulator 70 is atomized via injectors 60a, 60b, 60c, 60d towards an intake manifold. Fuel filter 100 is fixed to a body, etc of an automobiles. With reference to a fixing apparatus (bracket), metal bracket and resin bracket are practically utilized.

According to Japanese Unexamined Utility Model Publication No. 2-139358, a metallic fuel filter case is fastened to a metallic bracket by a screw and the bracket is mounted to a body via double vibration declining mechanisms made of rubber. Vibration of fuel filter is caused by operation of a fuel pump and/or injectors. The vibration damping mechanism is effective to prevent noise caused by transmission of the vibration of fuel filter. However, since metallic bracket requires the vibration declining mechanism, it costs high. Further, metallic bracket is heavy and easy to corrode.

Fuel filter is fixed by a resin bracket. For example, a fuel filter is cramped by utilizing elasticity of a resin arm. Two resin arms forming C shape cramp fuel filter. Facing two end portions of the arms are fastened by a bolt. The fuel filter is fastened between arms. The resin bracket is light weight and low cost. It is ,however, hard to fix securely. Fuel filter has fuel pipes. When fuel filter is deviated to a rotational direction, fuel pipes are deformed and loosed.

SUMMARY OF THE INVENTION

An object of the present invention is to provide fixing apparatus for fixing fuel filter securely with simple construction.

The fixing apparatus for fixing a fuel filter in the present invention comprises a ring portion for fixing fuel filter body securely by utilizing contraction force of resin. The fixing apparatus is made of resin softened by heat. The resin fixing apparatus has ring portion for accommodating and fixing a fuel filter. The inside shape of the ring portion is formed similar and somewhat smaller than the outer cylindrical shape of the fuel filter body. When the ring portion is heated and the resin and resin become flexible, the fuel filter is allowed to be press fitted into the ring portion. Heating temperature is desired to be higher than normal usage temperature range. Under this heating condition, the fuel filter is press fitted. In ordinal usage condition, the resin is hardened and contracted and the fuel filter is fixed securely. Since a bolt, etc to fasten the filter is not required, secure fixing is achieved with simple construction.

The fixing apparatus is required to have concave and/or convex portions on the ring portion in order to snap into concave and/or convex portions formed on the fuel filter body. These concave and/or convex portions restrict the filter to move a rotational direction thereof. Further, concave and/or convex portions on the ring portion are desired to have a shape restricting the filter to slip off from the ring portion.

The fixing apparatus has a fixing portion extending from the ring portion. Ribs having plate shape are formed as a reinforcing member between the fixing portion and the ring portion. In particular, ribs broadened on the same plane as the rotational direction of the fuel filter improve strength of the fixing portion at a rotational direction of the fuel filter, so that deformation of pipes is prevented when pipes are connected to the fuel filter.

BRIEF DESCRIPTION OF THE DRAWINGS

Other features and characteristics of the present invention as well as the function of related elements of the structure will become apparent to one of ordinary skill in the art from a study of the subject application and the appended claims and drawings, all of which form a part of this application. In the drawings, like reference numeral represent like elements and:

DETAILED DESCRIPTION OF THE PREFERRED EMBODIMENT

Figure 1:
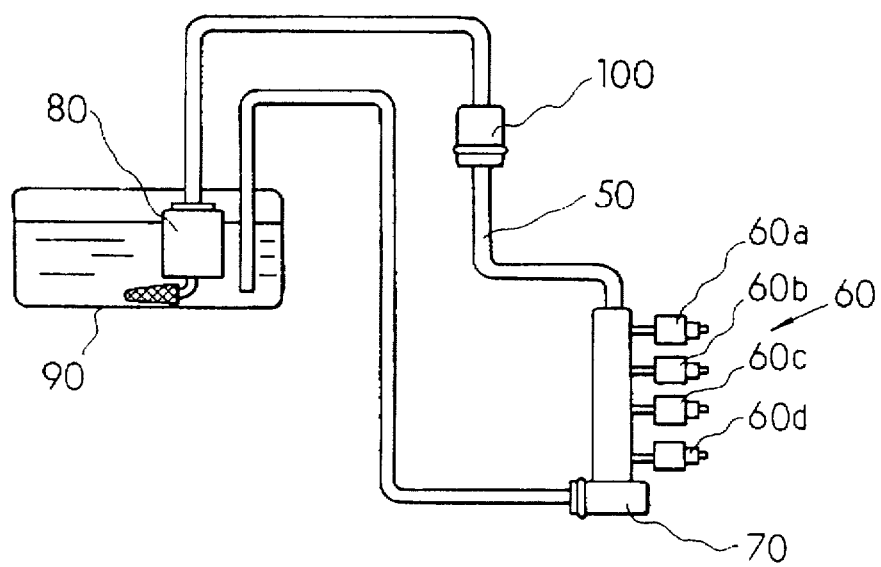
FIG. 1 shows a schematic view of ordinary fuel supply route in vehicles.
Figure 2:
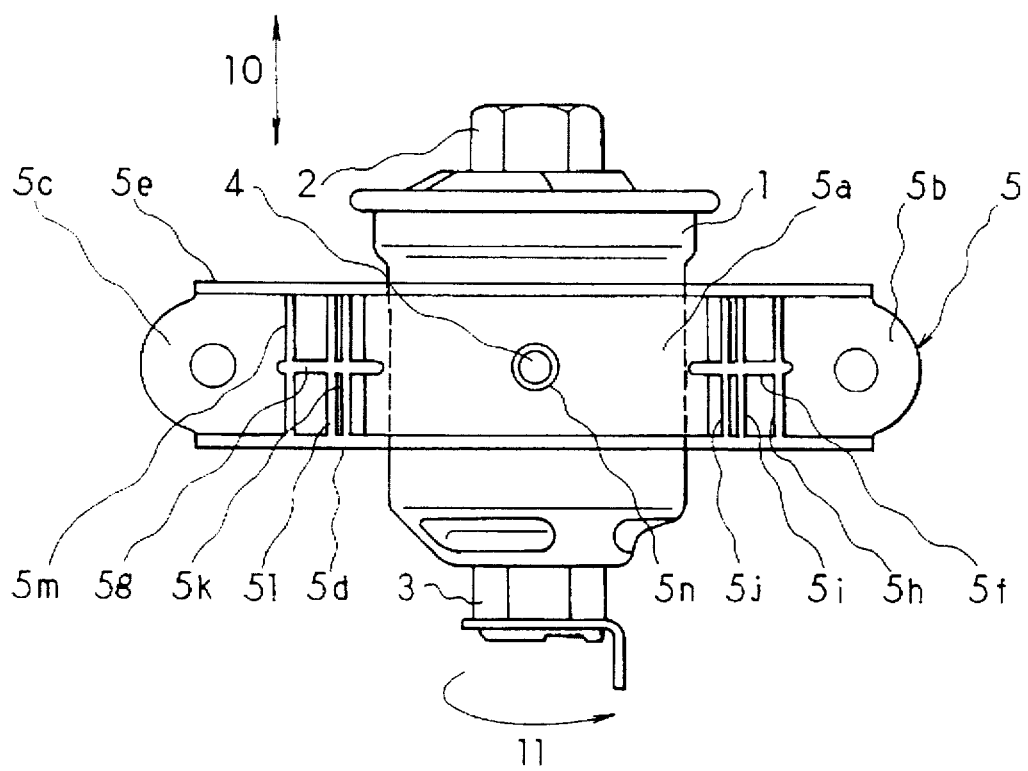
FIG. 2 shows a front view of a fuel filter and fixing apparatus of first embodiment of the present invention.
Figure 3:
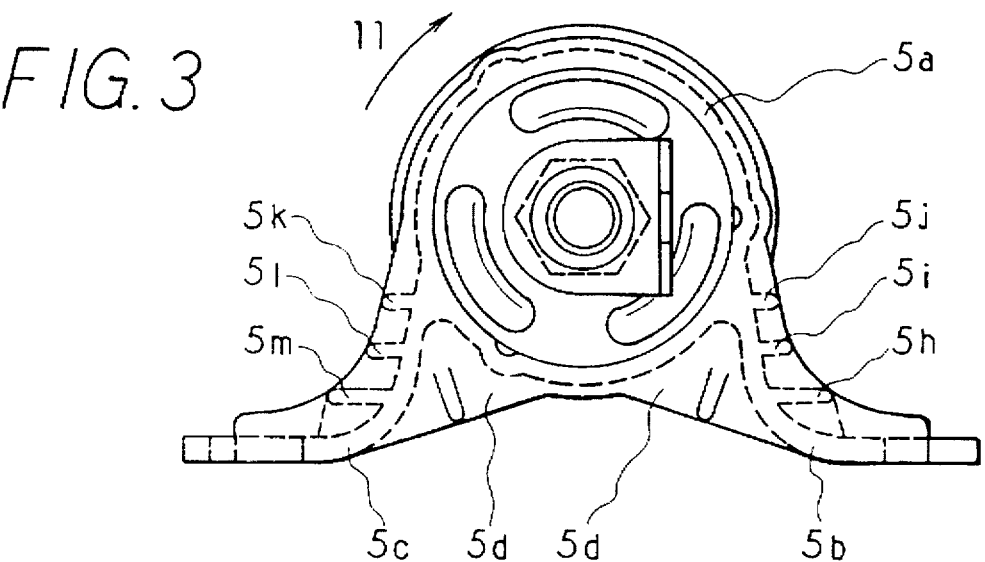
FIG. 3 shows a top view of a fuel filter and fixing apparatus of the first embodiment of the present invention.
Figure 4:
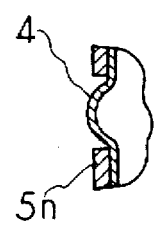
FIG. 4 shows a partially cross sectional view of a positioning portion of the first embodiment of the present invention.

The first embodiment applied to this invention is explained based on FIGS. 2 to 4. Fuel filter body 1 is made of cylindrical metric housing having an outlet and an inlet for fuel on the upper and lower portions thereof. Unions 2 and 3 for being connected with fuel route pipes are installed in the outlet and inlet.

Bracket 5 supports fuel filter body 1 and is fixed to a member of the vehicle side. Each parts 5a to 5n of bracket 5 is integrally formed by resin. As shown in FIG. 3, bracket 5 has a cylindrical ring portion 5a for press-fitting fuel filter body 1. Fixing portions 5b and 5c are in a plate configuration from the front view and are extending in a flare shape from the top view. Holes for threading through bolts are formed in the ends of fixing portions 5b and 5c. Ribs 5d and 5e having a plate configuration are formed so as to sandwitch ring portion 5a and fixing portions 5b and 5c from upside and bottomside. These ribs 5d and 5e have two reinforcing members. One is for reinforcing ring portion 5a and surrounding the periphery of ring portion 5a. The other is for reinforcing fixing portions 5b and 5c by extending to both sides of fixing portions 5b and 5c. Connecting portions for connecting ring portion 5a, fixing portions 5b and 5c form triangle shapes, and are disposed in between them in order to reinforce the connecting portions. Further, fixing portions 5b and 5c have ribs 5h, 5i, 5j, 5k, 5l and 5m extending the vertical direction between ribs 5e and 5d as shown in FIG. 3.

As shown in FIG. 2, ribs 5f and 5g are disposed parallel with ribs 5d and 5e. These ribs 5f and 5g connect with ring portion 5a and fixing portions 5b and 5c. Ribs 5h, 5i and 5j cross rib 5f at right angles, and ribs 5k, 5l and 5m cross rib 5g at right angles.

Ring portion 5a has a circular hole functioning as bracket side positioning portion 5n and fits with the projection functioning as body side positioning portion 4 disposed in the side of fuel filter body 1. A cross-sectional view of the fitting portion is shown in FIG. 4. Fixing portions 5b and 5c are fixed by bolts to the vehicle body. As the result, fuel filter body 1 is fixed to the vehicle body securely.

Bracket side positioning portion 5n on the side of ring portion 5a fits with body side positioning portion 4 on the side of fuel filter body 1. Even if an excessive force is added to fuel filter body 1 in a loosing direction 10, fuel filter body 1 is prevented from moving. Further even if fastening force is added to connect fuel route pipes, fuel filter body 1 is prevented from rotating in rotational direction 11. Further, when excessive force is added in loosing direction 10 and rotational direction 11, bracket 5 is required to prevent from deforming and destructing. Therefore, the reinforcing means, ribs 5d to 5m are disposed. The above resin bracket 5 accepts and holds fuel filter body 1 by the use of a heat expanding difference of the resin. Ring portion 5a of resin bracket 5 before assembled is formed smaller than fuel filter body 1 in a diameter. When assembling, ring portion 5a is preheated, and fuel filter body 1 is press-fitted therein when ring portion 5a is in a soft condition. At this time, body side positioning portion 4 provided to fuel filter body 1 is fitted with bracket side positioning portion 5n provided to bracket 5. As a result, fuel filter body 1 fits to bracket 5 by contraction of the resin material.

Figure 5:
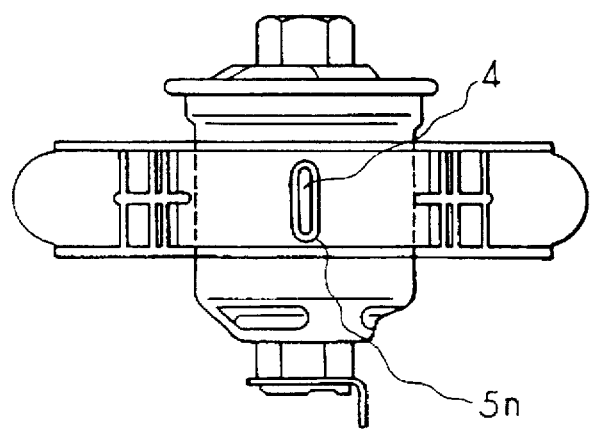
FIG. 5 shows a front view of other fuel filter and fixing apparatus having modified positioning portion.
Figure 6:
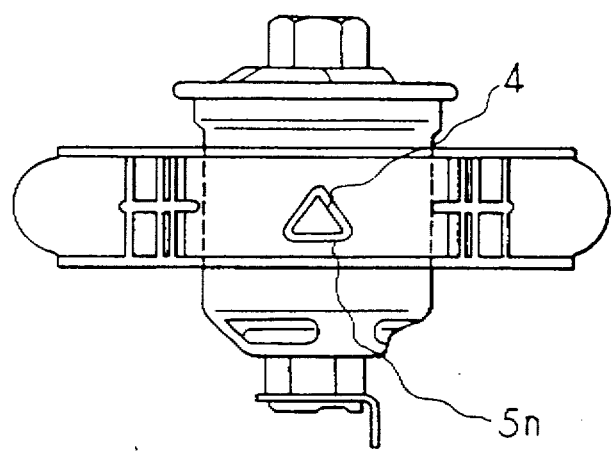
FIG. 6 shows a front view of other fuel filter and fixing apparatus having modified positioning portion.
Figure 7:
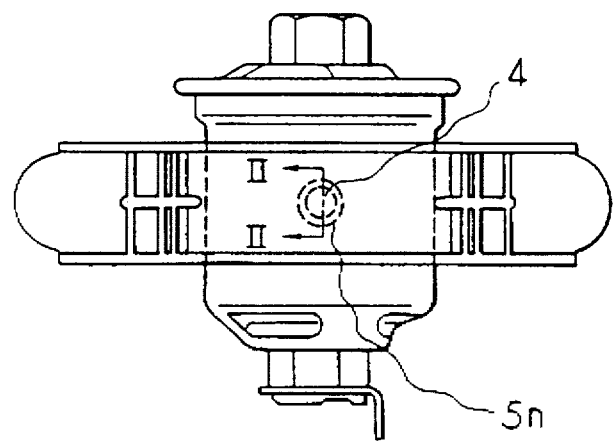
FIG. 7 shows a front view of other fuel filter and fixing apparatus having modified positioning portion.
Figure 8:
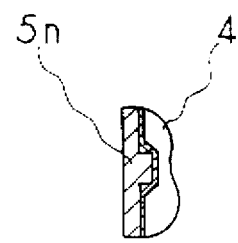
FIG. 8 shows a partially cross sectional view taken along line II—II of FIG. 7.
Figure 9:
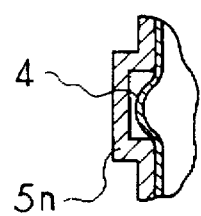
FIG. 9 shows a partially cross sectional view of a modified a positioning portion.
Figure 10:
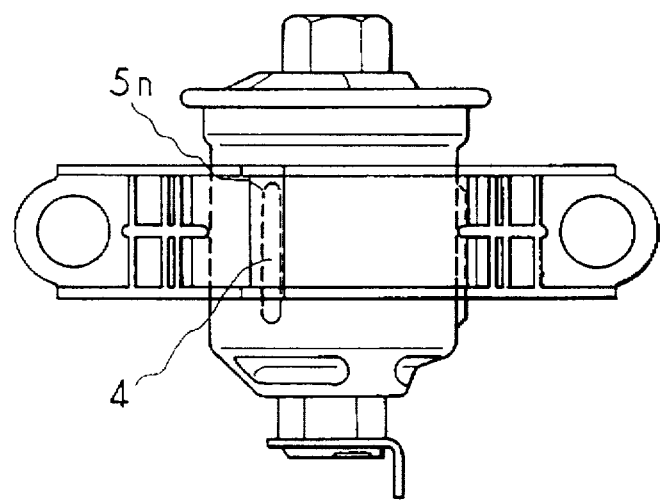
FIG. 10 shows a front view of a fuel filter and fixing apparatus having modified positioning portion.
Figure 11:
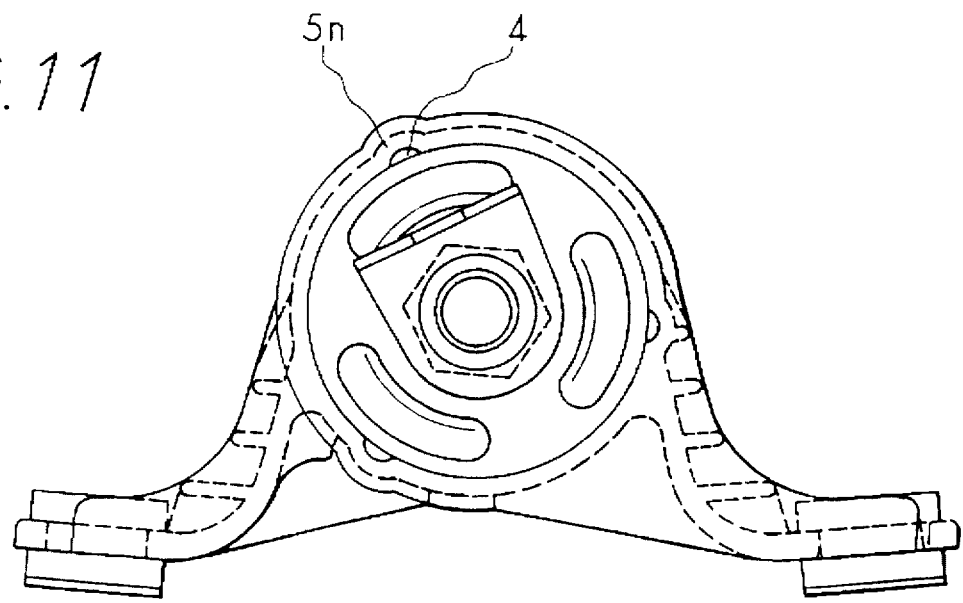
FIG. 11 shows a top view of a fuel filter and fixing apparatus having modified positioning portion.
Figure 12:
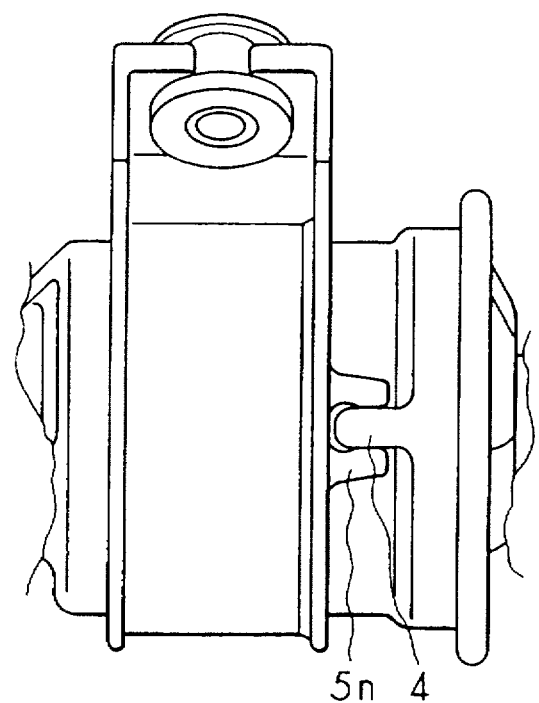
FIG. 12 shows a partially front view of a fuel filter and fixing apparatus having modified positioning portion.

In order to design fitting area between body side positioning portion 4 and bracket side positioning portion 5n larger, a long semi-spherical shape shown in FIG. 5 (4 and 5n), a polygon shape shown in FIG. 6 (4 and 5n) and the like are acceptable to prevent fuel filter body from loosing and rotating. As shown in FIGS. 7 or 8 (4 and 5n), it is acceptable that concave portion 4 in the fuel filter body side is fitted to convex portion 5n in the bracket side. As modification convex portion 4 in the fuel filter body side may be fitted to concave portion 5n in the bracket side as shown in FIG. 9. Further, as shown in FIGS. 10 and 11, it is acceptable to control only the movement of fuel filter in the rotational direction by providing convex portion 4 in the fuel filter body side extending along the longitudinal direction of fuel filter body 1 and concave portion 5n in the bracket side extending along the longitudinal direction of fuel filter body 1 to fit convex portion 4.

Ultrasonics means and press-fitting in a normal temperature are acceptable ways in which to press-fit fuel filter body 1 to bracket 5. According to the above embodiment, the present invention provides a fixing apparatus for a fuel filter and is lightweight, has a low price, and superior corrosion resistance.

Figure 13:
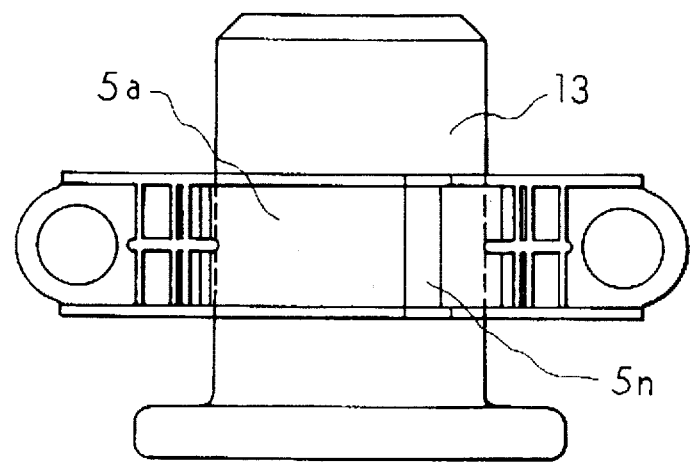
FIG. 13 shows a front view of a fixing apparatus and an electric heater heating the fixing apparatus.
Figure 14:
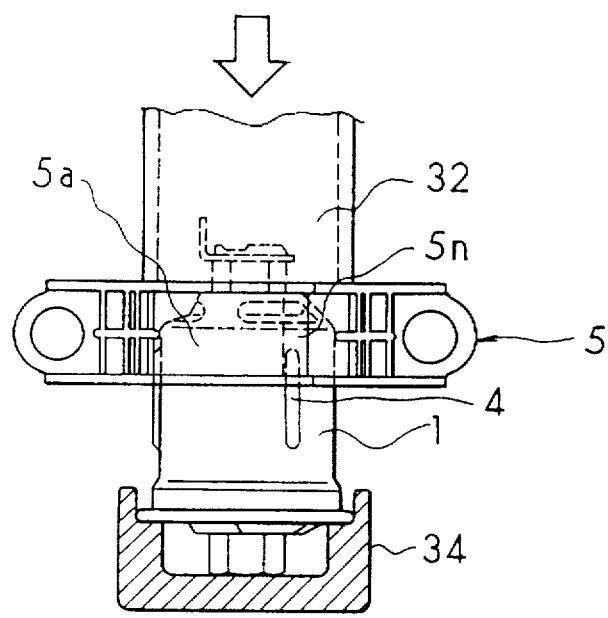
FIG. 14 shows a partially schematic front view which the fixing apparatus is inserting to the fuel filter located on a jig.
Figure 15:
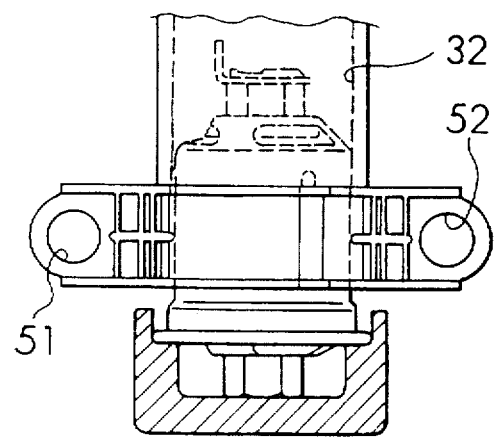
FIG. 15 shows a partially schematic front view which the fixing apparatus has inserted to the fuel filter located on the jig.

A manufacturing process is explained in FIG. 13–15. Fuel filter 1 is prepared. Fuel filter 1 has body side positioning portion 4 on a metallic casing thereof. A resin casing is also available. Resin bracket 5 is also prepared. In this embodiment, bracket 5 is integrally made of resin. Bracket side positioning portion 5n is also formed. As modification, it may design that only ring portion 5a is made of resin material softening and expanding when heated.

As shown i FIG. 13, cylindrical electric heater 13 is inserted into ring portion 5a of bracket 5. Heated ring portion 5a is softened and expanded by energized heater 13. Heating temperature by heater 13 is about 100° C. –150° C. which is higher than ordinary usage temperature. Instead of heating only ring portion 5a by heater 13, it may heat whole bracket 5 in constant temperature tank. Fuel filter 1 is disposed on receiving jig 34 as shown in FIG. 14. Bracket 5 is disposed on filter 1 to fit body side positioning portion 4 and bracket side positioning portion 5n accurately.

Press-fit jig 32 partially shown in FIGS. 14 and 15 is lowered downwardly to press-fit ring portion 5a of bracket 5 into filter 1. Press-fit jig 32 is stopped at condition shown in FIG. 15. Consequently fuel filter 1 is accommodated in ring portion 5a. In the inserting process, it is important that ring portion 5a is maintained at a high temperature condition and also in a softened and expanded condition.

After this inserting process, ring portion 5a is cooled and then hardened and contracted. Fuel filter 1 is securely fastened and fixed in ring portion 5a. After that, untivibration grommet (not shown) is installed into fixed bolt holes 51 and 52 formed at both ends of fixing portion of bracket 5. Bolts (not shown) is inserted into the grommet and fastened to an automotive body and/or parts fixed on an automotive body. Then pipes from a fuel tank and to an engine are connected to fuel filter.

Further other modifications are considered. At least ring portion 5a of bracket 5 may be made of material contracted by heat. In this case, filter 1 is inserted or press-fitted into ring portion 5a firstly. Ring portion 5a is heated and contracted secondly.

The preferred embodiments described herein are therefore illustrative and not restrictive, the scope of the invention being indicated by the appended claims and all variations which come within the meaning of the claims are intended to be embraced therein.

What is claimed is:

1. A fixing apparatus for fixing a fuel filter body comprising:

fastening means for fixing a filter body, said fastening means having an inside shape formed similar to and smaller than an outer shape of the filter body in order to press-fit with the filter body; and fixing means for supporting said fastening means and fixing said fastening means and the filter body to an automobile, wherein said fastening means is made of resin which is softened by heat and which fastens the filter body by contraction of said resin; and further comprising a rib component extending in a direction perpendicular to a longitudinal direction of said fastening means, said rib component standing between said fastening means and said fixing means.

2. A fixing apparatus for fixing a fuel filter body comprising:

a ring portion for accommodating and fixing a filter body; and a fixing portion for supporting said ring portion and extending from said ring portion;

wherein an inside of said ring portion is formed similar to and somewhat smaller than an outer shape of the filter body in order to press-fit with the filter body, wherein said ring portion is made of resin which is softened by heat and which fastens the filter body by contraction of said resin;

further comprising a rib component extending in a direction perpendicular to a longitudinal direction of said ring portion, said rib component standing between said ring portion and said fixing portion.

3. A fixing apparatus for fixing a fuel filter body according to claim 2, wherein said ring portion is softened to press-fit the filter body when heated higher than an ordinary usage temperature range.

4. A fixing apparatus for fixing a fuel filter body according to claim 3, wherein said ring portion comprises a concave portion and convex portion to fit a convex portion and concave portion of the filter body respectively.

5. A fixing apparatus for fixing a fuel filter body according to claim 4, wherein said concave portion and convex portion of said ring portion fit the filter body so as to restrict a movement of the filter body in rotational direction and longitudinal direction.

6. A fixing apparatus for fixing a fuel filter body according to claim 2, wherein said ring portion comprises a concave portion and convex portion to fit a convex portion and concave portion of the filter body respectively.

7. A fixing apparatus for fixing a fuel filter body according to claim 6, wherein said concave portion and convex portion of said ring portion fit the filter body so as to restrict a movement of filter body in rotational direction and longitudinal direction.

8. A bracket made of resin comprising:

a cylindrical ring portion for accommodating and fixing an object having a cylindrical outer shape to be held therein; and a fixing portion extending from said ring portion for supporting said ring portion, wherein said ring portion is formed in an analogous shape of an outer shape of the object to receive the object thereto, said ring portion is made of resin which is softened by heat to fasten the object by contraction of said resin;

further comprising a rib component extending in a direction perpendicular to a longitudinal direction of said cylindrical rind portion, said rib component extending between said cylindrical ring portion and said fixing portion.

9. A bracket according to claim 8, wherein said ring portion is made of thermoplastic resin, and said ring portion is in a state where the object will be press-fitted thereto after said ring portion is softened by heat.

10. A bracket according to claim 8, wherein said rib component comprises a plate-like first rib provided from said ring portion to said fixing portion; and a second rib in parallel with said first rib, and wherein said ring portion and said fixing portion are provided between said first rib and said second rib so as to connect therebetween.

11. A bracket according to claim 10, further comprising:

a plurality of connecting ribs provided between said first rib and said second rib to connect therebetween.

12. A bracket according to claim 10, further comprising:

a third rib provided between said first rib and said second rib, said third rib being in parallel with said first rib and said second rib.

13. A bracket according to claim 10, wherein, the object includes an operational portion at an end portion in the axial direction thereof, the operational portion being axially rotated, and said ring portion includes a position determining portion for allowing the operational portion to rotate within said ring portion by deforming with a predetermined torque.

14. A bracket according to claim 13, wherein, said position determining portion defines an axial position of said object within the ring portion.

15. A bracket according to claim 14, wherein, the object is a filter having an operational portion at an end portion thereof for pipe connection.

16. A bracket according to claim 8, wherein, the object includes an operational portion at an end portion in the axial direction thereof, the operational portion being axially rotated, and said ring portion includes a position determining portion for allowing the operational portion to rotate within said ring portion by deforming with a predetermined torque.

17. A bracket according to claim 16, wherein, said position determining portion defines an axial position of the object within said ring portion.

18. A bracket according to claim 1, wherein, the object is a filter having an operational portion at an end portion thereof for pipe connection.

* * * * *